Patented Oct. 2, 1934

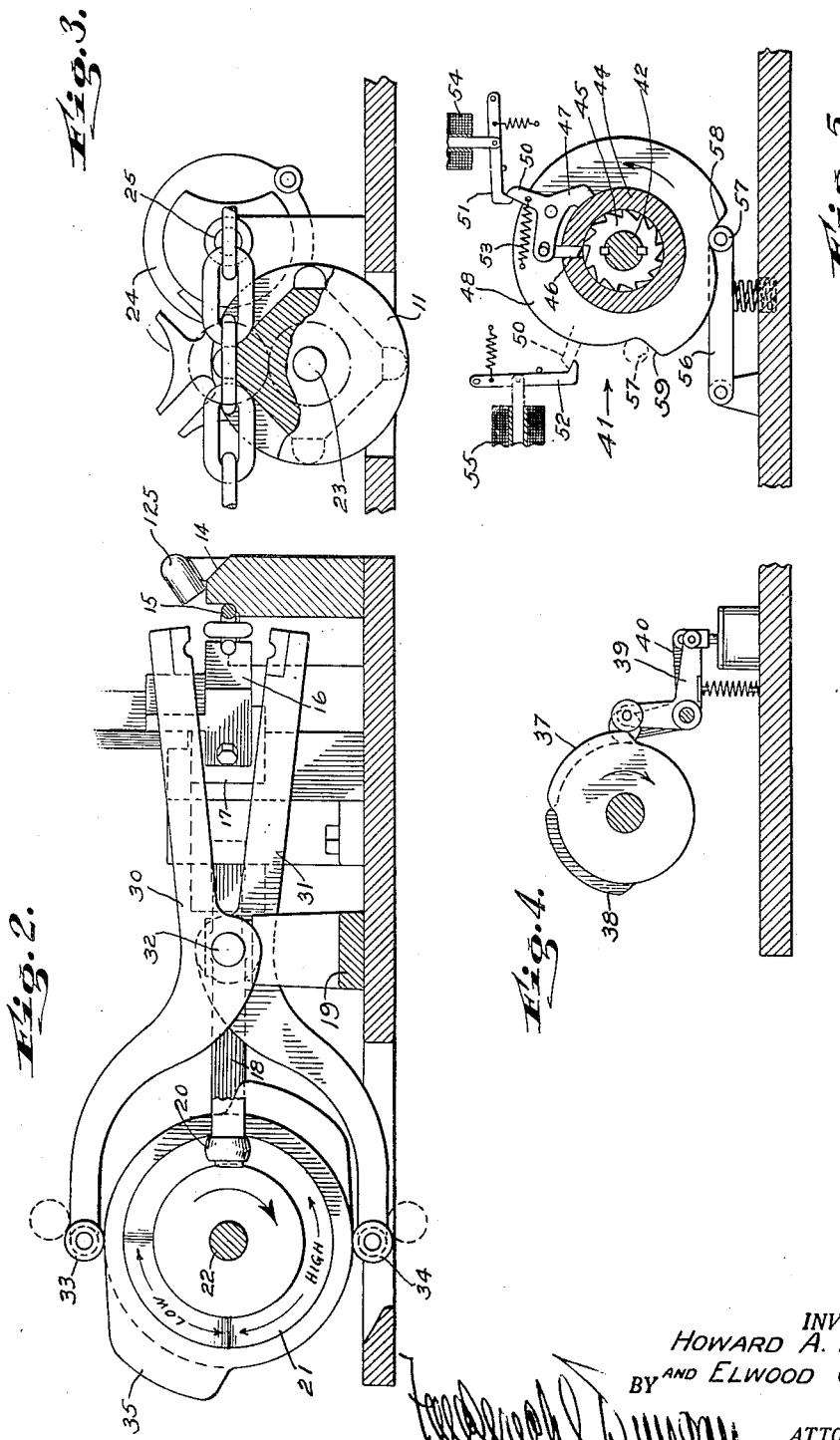

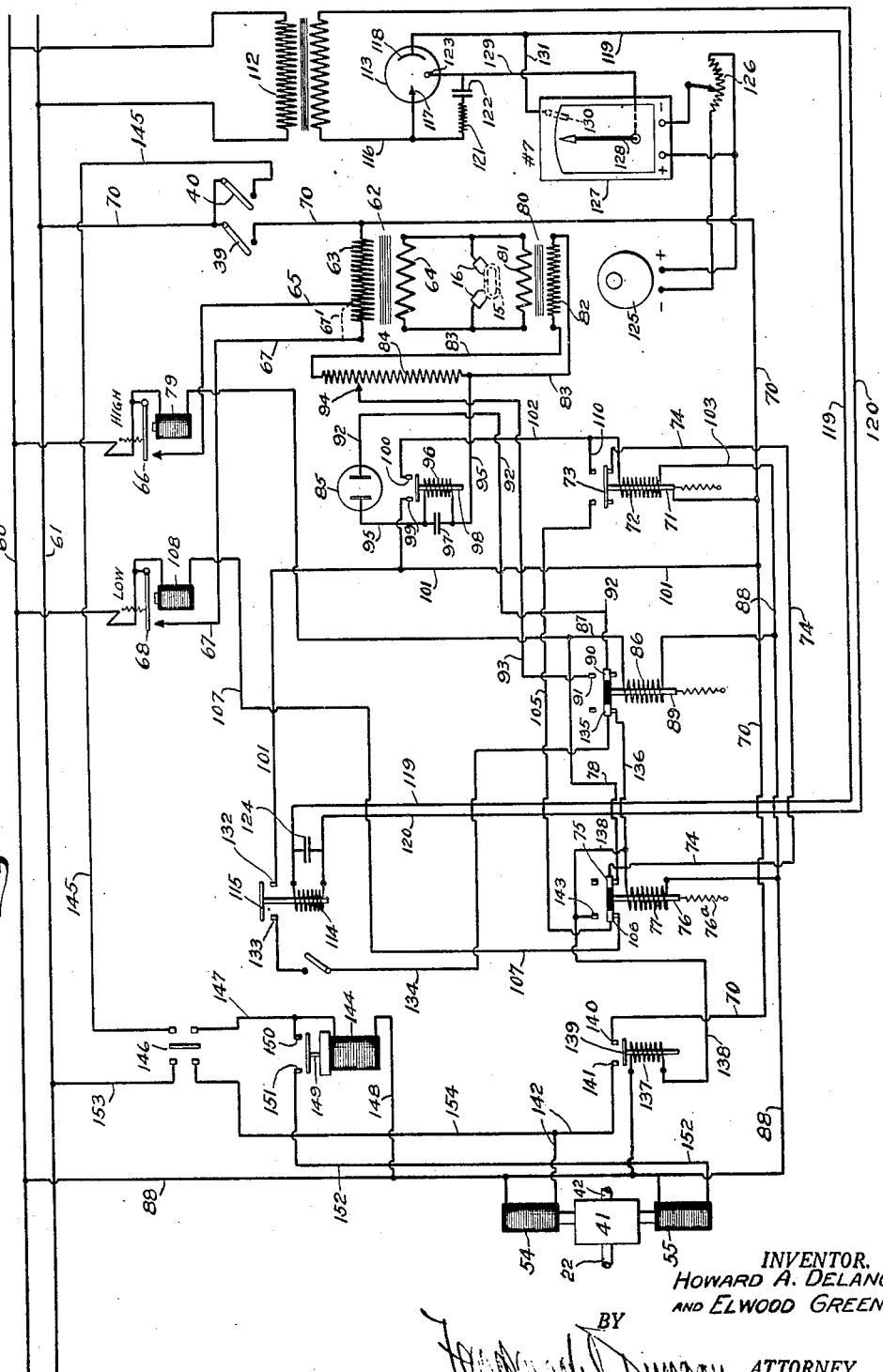

1,975,753

UNITED STATES PATENT OFFICE 1,975,753

WELDING METHOD AND APPARATUS THEREFOR

Howard A. Delano, Springettsbury Township, York County, and Elwood Greene, Spring Garden Township, York County, Pa., assignors to American Chain Company, Inc., a corporation of New York Application July 15, 1931, Serial No. 550,860

22 Claims. (Cl. 219—4)

The present invention relates to welding machines and has for an object to provide an automatic control thereof.

More particularly, the invention provides means for automatically cutting off the welding current when the weld has reached a predetermined temperature, so as to prevent overheating or burning of the weld, on the one hand, and underheating on the other. In other words, the current will be maintained through the weld until the temperature rises to the desired point, whereupon automatic devices will cut off the current and turn off the welder. An advantage of this arrangement is that it will actually save time in operation because it will hold the weld accurately to a predetermined point of temperature without overrunning as has often been the case heretofore.

A welding machine combines certain mechanical operations with certain electrical operations. Thus, the work may be brought to the welding position, the parts to be welded pressed together and the electrodes for supplying welding current to the work pressed thereagainst, all of which operations are mechanically performed. The welding current is then turned on by the mechanical operation of a switch. While the weld is being made the machine may be stopped as no mechanical operations need be performed.

The duration of the welding period cannot be accurately timed by mechanical means as it will vary with different classes of work and different specimens of the same class of work. Heretofore, it has been the practice to cut off the current manually when the operator deemed that the proper temperature has been reached, and to gage this temperature occularly, by noting the color of the weld. As soon as the welding current was turned off the machine was restarted to swage the weld and perform other operations. Naturally, with manual control of the welding temperature serious errors occur, with the result that there may be wide variations in the welding temperature of successive pieces of work. Furthermore, if the welding machine is to operate at fairly high speed the chances of error on the part of the operator are proportionately increased.

It is an object of the present invention to provide a machine in which the judgment of the operator is entirely eliminated and the whole welding operation is controlled automatically. The machine performs certain operations mechanically and then, just before stopping, turns on the welding current which continues until a device sensitive to radiations from the weld, cuts off the current and restarts the machine. In a specific embodiment of our machine we employ a radiation pyrometer to control the cutting off of the welding current. This pyrometer, being directly sensitive to radiant heat, will operate with accuracy when the desired temperature has been reached, to cut off the electric current.

In order to insure extreme accuracy in the duration of the welding period, we prefer to use a two stage welding operation. In the first stage the work is brought up very quickly to the vicinity of the desired welding temperature, after which the weld enters the second stage in which the rise of temperature is more gradual. There is thus a saving of time in the use of rapid heating for part of the welding operation coupled with the assurance of great accuracy in cutting off the current at the desired welding temperature, while the weld is being slowly heated. In order to determine the duration of the first stage, we have provided means controlled by the electrical resistance of the weld to terminate the first stage and begin the second stage. The termination of the second stage is then controlled by the radiation pyrometer. It will be observed that this control is dependent not upon the appearance of the weld or the color thereof, but upon the actual temperature of the weld or the intensity of the heat radiation therefrom.

As another feature of our invention, we employ electro-magnetic means for determining the cooling period of the weld.

Other objects and advantages of our invention will appear in the following description of a preferred embodiment and thereafter the novelty and scope of the invention will be pointed out in the claims.

In the accompanying drawings;

Fig. 2 is a view in section taken substantially on the line 2—2 of Fig. 1;

Fig. 3 is a detail view of the means for feeding the chain through the welder;

Fig. 4 is a detail view of certain cam controlled switches, the view being a section taken on the line 4—4 of Fig. 1;

Fig. 5 is a view in section taken on the line 5—5 of Fig. 1, and showing a clutch used to control the starting and stopping of the mechanical operation of the welding machine; and Fig. 6 is a diagram of electrical connections.

Mechanical features

Figure 1:
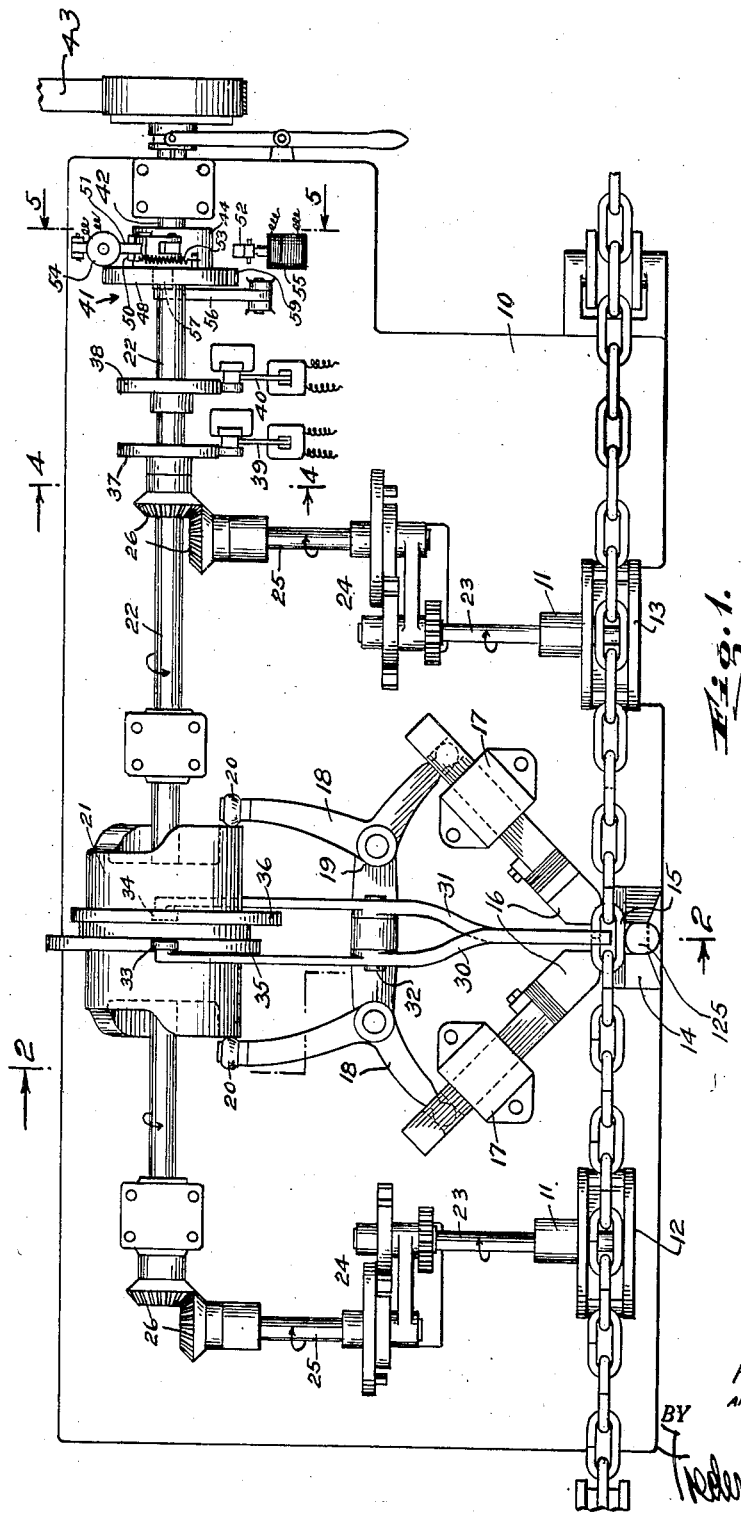
Figure 1 is a plan view of a chain welding machine embodying our invention.

The welding machine comprises a bed plate 10 supporting journals 11 for a pair of sprocket wheels 12 and 13 on which the chain to be welded is carried. The sprocket wheels are disposed at opposite sides of a guide block or anvil 14 which is suitably grooved to support the link 15 that is to be welded. A pair of electrodes 16 are adapted to press the link ends together and also to establish a good electrical connection therewith. The electrodes are mounted to slide in bearings 17 at an angle to the direction in which the chain is fed. The electrodes are slid in their bearings by means of a pair of bellcranks 18 mounted on a bracket 19 fixed to the bed plate. One arm of each bell-crank has a ball and slot connection with the adjacent electrode, while the other arm is provided with a roller 20. These rollers bear on opposite end faces of a cam 21, secured upon a cam shaft 22, journaled in suitable bearings fixed upon the bed plate.

Each of the sprocket wheels 11 and 12 is secured upon a shaft 23 which driven through Geneva gears 24 by another shaft 25, the latter being driven through miter gears 26 by the cam shaft 22. The Geneva gearing is such that the sprocket wheels 11 and 12 are held stationary during three-quarters of each rotation of the cam shaft 22 and are turned through ninety degrees during the fourth quarter to bring a new link into welding position.

A pair of swaging levers 30 and 31 are adapted to swage the welded joint of the link. These levers are mounted on a horizontal pivot 32 carried by the bracket 19 and, at their rear ends, are provided with rollers 33 and 34 respectively, which engage cam surfaces 35 and 36 formed on the cam 21. The cam shaft 22 also carries a pair of cams 37 and 38 which are adapted to operate a pair of switch levers 39 and 40 respectively (see Fig. 4). The cam shaft 22 is driven through a clutch 41 by a drive shaft 42 which in turn is driven by a belt 43 connected with a suitable source of power.

A detail view of the clutch is shown in Fig. 5. Fixed upon the cam shaft 22 is a hub 44 into which projects the drive shaft 42 and a ratchet wheel 45 fixed to the shaft 42. Mounted to slide in a radial bore in the hub 44 is the clutch pin 46 which is adapted to engage the teeth of the ratchet wheel 45. The outer end of the clutch pin 46 is pivotally connected to an arm 47 of a three-armed lever, the latter being pivoted upon a cam disk 48 carried by the hub 44. A second arm 50 of the three-armed lever is adapted to engage one or the other of a pair of latch levers 51 and 52 respectively. A spring 53 normally urges the pin 46 into clutching position, but when the arm 50 is engaged by one of said latch levers the pin is withdrawn. The latch lever 51 is connected to the core of a solenoid 54 while the latch 52 is connected to the core of solenoid 55. Normally, these latch levers lie in the path of the arm 50, but they may be withdrawn against the pull of a spring by energizing the solenoids 54 and 55 respectively.

To facilitate withdrawal of the clutch pin when arm 50 is engaged by latch levers 51 and 52, a spring-pressed arm 56 is provided. A roller 57 carried by the arm 56 bears upon the periphery of the cam 48, which is in the form of two spirals terminating in abrupt shoulders 58 and 59. The roller 57 slides down the shoulder 58 just before latch 51 engages arm 50, giving the cam hub 44 a forward thrust which overcomes any binding of the pin 46 in its bearing. The shoulder 59 performs a similar function just as the latch 52 is about to engage the arm 50.

At the start of a cycle of operations, the clutch arm 50 is engaging the latch 52, the first operation therefore is to energize the solenoid 55 so as to withdraw this latch. As soon as this occurs the cam shaft 22 starts to turn and by turning the guide wheels 12 and 13 feeds a freshly welded chain link out of the anvil and a new link to be welded in position in the anvil. The cam 21 then spreads apart the rollers 20 forcing the electrodes 16 against the new link so as to press the free ends of the link together and to establish a good contact between the electrodes and the link at opposite sides of the joint that is to be welded. By this time, the clutch lever 50 will be brought into engagement with the latch 51 withdrawing the pin 46 from the ratchet wheel 45 and arresting the cam shaft 22.

Just before the cam shaft is stopped the cam 37 operates the switch 39 to close an electric circuit which will pass a welding current through the link. The closure of the switch 39 results in a series of electrical operations which will now be described, reference being had to Fig. 6 which shows the various electrical circuits.

Electrical circuits

Alternating current is fed to the machine from a pair of power mains 60 and 61. This current is stepped up to a high amperage by means of a transformer 62 having a primary winding 63 adapted to be connected to the mains 60 and 61 and a secondary 64 connected to the electrodes 16. It will be observed that the primary winding is provided with two taps, one of which is connected by a line 65 through a switch 66 to main 60 while the other is connected to said main by a line 67 through a switch 68. The switch 66 will be called the high voltage switch because when the current passes through the line 65 a smaller part of the primary winding is energized and consequently the voltage is higher than when the current is passed through the line 67 and the entire primary winding is energized. The arrangement is such that the high voltage is first employed to bring the temperature of the link rapidly up to a point near the desired welding point and thereafter the high voltage switch 66 is opened and the low voltage switch 68 is closed, to bring the weld more slowly to the desired welding temperature.

The operation of the switches 66 and 68 is electrically-controlled as follows: Normally the switches are held open by springs, as shown. When the cam controlled switch 39 is closed current passes from the main 61, through a line 70 and the core 71 of a solenoid 72, and thence through a contact plate 73 carried by said core, to a line 74. The line 74 may be traced to a contact member 75 carried by, but insulated from, the core 76 of a solenoid 77. A spring 76a holds the core 76 normally in depressed position maintaining the member 75 in contact with a line 78 whereby the circuit is continued through a magnet 79 to the main 60. The magnet 79 controls the switch 66 so that the high voltage section of the transformer primary 63 is now connected across the mains 60 and 61 by way of switch 66 and line 65. Current induced in the secondary 64 then passes through the link 15 bringing the latter up quickly to a temperature somewhat below the desired welding heat.

Another transformer 80 is provided, said transformer being of the "step-up" type. The primary 81 of the transformer is connected in parallel with the electrodes 16 and the secondary 82 is part of a closed circuit 83 including a potentiometer winding 84. Across the potentiometer is connected a neon tube 85, the circuit of which, however, is controlled by a solenoid switch.

*Control of the first welding stage*

The solenoid 86 of said switch is energized when the cam switch 39 is closed as follows: Current running through the line 78 is tapped off by a line 87 and after passing through said coil runs to a line 88 which leads directly to the main 60. In other words, the solenoid 86 is connected in parallel with the magnet 79. When the solenoid 86 is energized the plunger 89 thereof is raised against spring tension and a contact member 90 carried by the plunger engages a contact point 91. The contact member 90 is connected by a line 92 to one terminal of the neon tube, while the contact point 91 is connected by a line 93 to an adjustable tap 94 slidable on the potentiometer winding 84. The other terminal of the neon tube 85 is connected by a line 95 to a fixed tap on the potentiometer winding. The line 95 includes the winding 96 of another solenoid switch and also a condenser 97 connected in parallel with said winding.

The link 15 short circuits the primary of the transformer 80 so that the induced voltage in the secondary 82 is insufficient to pass the gap in the neon tube. However, as the temperature of the link 15 increases, its resistance increases and a greater proportion of current flows through the primary 81. Thus, when the temperature of the link 15 rises above a certain temperature, current will begin to flow through the neon tube, but it will be too weak to lift the plunger 98 of solenoid 96. However, the condenser will be charging, and at a predetermined temperature of the link 15, sufficient tension will be developed to cause discharge of the condenser, energizing the solenoid 96 sufficiently to raise its plunger 98 and bridge a pair of contacts 99 and 100. The effect of this is to throw out the high voltage switch 66 and throw in the low voltage switch 68 as follows: Current from the main 61 running through the cam switch 39 and line 70 passes up through a lead 101 to the contact point 99 and thence runs through contact point 100, line 102, solenoid winding 72, line 103 to the line 88 which is connected to the main 60. When the solenoid 72 is energized its plunger 71 is raised, breaking the circuit between the plunger 71 and the line 74, thereby breaking the circuit through the magnet 79 and permitting the switch 66 to swing open. At the same time, the circuit through the solenoid 86 is broken and the plunger 89 thereof is drawn downward by spring pressure, breaking contact between the points 90 and 91. This throws out the neon tube circuit.

*The second welding stage*

When the solenoid 72 raises its plunger 71, the contact member 73 carried thereby makes contact with a line 105 and the latter is connected through a contact 106 carried by the plunger 76 to a line 107 which runs through a magnet 108 to the main 60. The magnet 108 controls the low voltage switch 68 and when thus energized closes said switch 68, so that the welding current passing through the link 15 is proportionately reduced. It will be noticed that when the solenoid 72 is actuated by the momentary operation of the solenoid 96 the plunger 71 is locked in raised position, because current continues to flow through the winding 72 as follows: Current from the line 70, running through the solenoid plunger 71 and contact plate 73 continues through a branch line 110 to the line 102, so that the winding 72 remains energized as long as current is flowing through the line 70.

*Control of the second welding stage*

The period during which the low voltage switch is held closed is determined as follows: Connected across the mains 60 and 61 is a transformer 112 which supplies current to the grid glow tube 113, and the solenoid 114 of a delicate relay 115. The circuit may be traced as follows: From the secondary of the transformer 112, a line 116 runs to the anode 117 of the glow tube 113 and the cathode 118 of the glow tube is connected by a line 119 to one terminal of the solenoid 114, the other terminal being connected by a line 120 to the other terminal of the secondary of the transformer 112. The glow tube 113 is provided with the usual resistance 121 and condenser 122 connected across the anode 117 and the grid 123. The grid glow tube 113 normally provides rectified current to energize the solenoid 114. As long as this solenoid is energized the plunger 115 thereof is maintained in raised position against the pull of a spring, thus holding open a circuit which will be explained presently. A condenser 124 bridged across line 119 and 120 serves to smooth out pulsations in the rectified current.

Adjacent the link 15 is a radiation pyrometer 125 which is connected through an adjustable resistance 126 to a galvanometer 127. The galvanometer needle 128 is connected by a line 129 to the grid 123 of the glow tube 113, and a branch line 131 leads from the line 119 to a contact point 130 which lies in the path of the galvanometer needle. The resistance 126 is so adjusted that when the temperature of the link reaches a predetermined point, the needle 128 will be moved into engagement with the contact point 130. This will throw a negative bias across the grid of the glow tube, extinguishing said tube and thus deenergizing the relay 114. The relay plunger will then drop and the plate 115 will bridge the contacts 132 and 133. Contact 132 is connected to line 101, while contact 133 is connected to a line 134 which leads to a contact member 135 carried by the plunger 89 of the solenoid 86. Since the solenoid 86 is now deenergized and the plunger is in its lower position, the member 135 is in contact with a line 136 which completes the circuit through the solenoid 77 to the line 88. The solenoid 77 being thus energized raises its plunger, interrupting the circuit through the magnet 108 and permitting the low voltage switch 68 to open.

At the same time a solenoid 137 is energized as follows: From the line 136 a branch line 138 feeds current through the solenoid 137 and thence to the line 88, so that said solenoid 137 is connected across the mains 60 and 61. When the solenoid is thus energized it raises its plunger 139 closing a circuit through the solenoid 54. This circuit may be traced as follows: An extension of the line 70 runs to a contact point 140 and when the plunger 139 is raised this contact point is connected to a point 141. A line 142 runs from the point 141 through the solenoid 54 and thence to the line 88. The solenoid 54 thus energized retracts the latch 51 (Fig. 5) permitting the clutch pin 46 to be moved by the spring 53 into engagement with the toothed shaft 45 and this restarts the cam shaft. The cam shaft 22 then makes substantially a quarter turn during which time the cam surfaces 35 and 36 spread the rollers 33 and 34 apart causing the levers 30 and 31 to swage the welded joint; also during this period the cam 37 opens the switch 39 and the cam 38 closes the switch 40. The opening of the switch 39 permits the solenoids 72 and 77 to be deenergized so that the plungers 71 and 76 will drop to the normal position illustrated and be ready for the next cycle of operations.

It will be noted that when the solenoid 77 was energized to raise its plunger and throw the low voltage switch open, the plunger was held in raised position by current running from the line 70 through the plunger 71, contact plate 73, line 105, contact member 106 to a contact point 143 connected with the line 138 so that current continued to flow through the winding 77 from the line 138 to the line 88. On opening the switch 39, however, this circuit is interrupted and the plunger 76 drops to position for the next cycle of operations.

*Control of the cooling period*

The cam switch 40 remains open until the clutch arm 50 is engaged by the latch 52 at which moment, just before the cam shaft is declutched, the switch 40 is closed to complete a circuit through a slow acting relay 144. The circuit may be traced from the main 61 through the switch 40, line 145, hand switch 146 which is normally swung to the right (as viewed in Fig. 6) and line 147, to one terminal of the magnet 144, the other terminal of which is connected by a line 148 to the line 88. The purpose of the slow acting relay 144 is to provide a time period during which the link may be cooled sufficiently before the chain is moved to present a new link to the welding point. Obviously, this time period could be taken care of by providing a suitable dwell in the cam 21. However, this would involve a larger cam than would be desirable and it has been found preferable to control the delay for cooling by a slow acting relay.

The relay 144 gradually builds up sufficient energy to raise its plunger 149 and bridge a pair of contacts 150 and 151. The contact 150 is connected to the line 147 and the contact 151 is connected by a line 152 to one terminal of the solenoid 55, the other terminal of which is connected to the line 88. When the solenoid 55 is energized it withdraws the latch 52 and the cycle of operations is completed. The cam shaft 22 starts rotating again to bring a new link into welding position and the cam 38 opens the switch 21.

*Operation of the machine*

The operation of the machine will now be readily understood. After the machine has brought a link into position to be welded and has forced the link ends together under pressure of the electrodes 16, the cam 37 operates to close the switch 39 just before the clutch is disengaged by contact of the clutch arm 50 with the latch 51. When the switch 39 is closed magnet 79 is energized closing the high voltage switch 66 and starting the first stage of the welding operation. At the same time the glow tube 85 is connected to the potentiometer 94 by relay 86. The transformer 62 is energized supplying the welding current to the electrodes 16 and the link ends 15 are brought up rapidly to a temperature close to the desired welding point. As the temperature and hence the resistance of the link 15 also rises, the transformer 81, receives increased current causing the tube 85 to glow. When the requisite temperature has been reached by the link 15 the condenser 97 connected in the circuit of the glow tube 85 will discharge, momentarily energizing the relay 96 which, by bridging contacts 99 and 100, causes the winding of the relay 72 to be energized, lifting the plunger 71 and breaking the circuit of magnet 79 and the relay 86. Thus the high voltage switch 66 will be opened and the tube 85 will be disconnected from the potentiometer. At the same time a circuit will be completed through the magnet 108, closing the low voltage switch 68. The relay 72 in the meantime remains energized due to the branch line 110 connecting the plate 73 through the winding of the relay and by way of line 103 and line 88 to the main 60.

The second stage of the relay operation now begins with the relay plunger 71 in raised position, the relay plungers 76 and 86 in lowered position. When the weld is heated to the desired degree of temperature the radiation pyrometer 125 throws a negative bias across the grid of the glow tube 113 which momentarily deenergizes the delicate relay 114, thereby energizing relay 77, breaking the circuit of magnet 108 and permitting switch 68 to open. This terminates the second stage of the welding operation.

When relay 77 is energized its plunger 76 is raised closing a circuit through the relay 137 which in turn energizes solenoid 54. This withdraws the latch 51 permitting the clutch to be engaged and start the rotation of the cam shaft. The cam shaft will now turn through an angle of 90 degrees before the clutch is disengaged by striking the latch 52 and during this period the swaging operation will take place. Just before the cam shaft has completed a quarter turn the switch 39 is opened to deenergize the relays 72 and 77 and permit these relays to return to normal position. At the same time, the cam 38 operates to close the switch 40. This closes a circuit through the delay action relay 144, which controls the circuit of the solenoid 55. The relay 144 operates slowly so that the solenoid 55 will not retract the latch 52 until the weld has had time to cool sufficiently. When the latch 52 is retracted the cam shaft starts turning again to withdraw the welded link and to feed a new link to welding position.

The switch 146 permits of manual control of the welding operation. When the machine is to be manually controlled, the tap 94 on the potentiometer is set for a cut off temperature greater than required in the link to be welded. The switch 146 is then moved toward the left (as viewed in Fig. 6) when in the operator's judgment the proper temperature of the weld has been reached. This completes a circuit from main 61 through lines 153, 154, 142, solenoid 54 and line 88 to main 60 thereby actuating the solenoid 54 which starts the mechanical operation of the machine. When the machine stops by engagement of the clutch arm 50 with the latch 52, the operator swings the switch 146 toward the right which throws in the time delay relay 144 and causes the eventual operation of solenoid 55 to withdraw the latch 52 and restart the machine. If it is desired to eliminate the two stages in the welding operation, this can readily be done by connecting the line 67 to the line 65, as indicated by the broken line 67'. We have found, however, that it is preferable to use the two stages because a more accurate control of the requisite temperature is thereby obtained.

We have described our invention as applied to a chain welding machine, but it will be understood that this is illustrative and not limitative of the invention and that we reserve the right to apply the same to other types of welding machines and also to make such changes in form, arrangement, and construction of various parts as fall within the spirit and scope of the following claims.

We claim:

1. A method of welding a joint which includes the steps of passing an electric current through the joint to heat said joint to a predetermined welding temperature, and using radiant heat from the joint to interrupt said current when said temperature has been reached.

2. A method of welding a joint which consists in heating the joint rapidly until the electrical resistance through the joint has reached a predetermined value, thereafter heating the joint slowly until it has reached a desired welded temperature, and utilizing radiant energy generated in the joint to interrupt the heating of the joint when said temperature has been reached.

3. In an electric welding apparatus, means for establishing an electric welding circuit through a joint to be welded, a thermo-electric couple adjacent said joint and adapted to generate electric current of potential proportional to the temperature of the heat radiating from said joint, and means controlled by said current for breaking said circuit when said potential reaches a predetermined value.

4. In an electric welding apparatus, means for establishing an electric welding circuit through a joint to be welded, a thermo-electric couple adjacent said joint and adapted to generate electric current of potential proportional to the energy radiated from said joint, and means responsive to said current for breaking said circuit when said potential reaches a predetermined value.

5. In an electric welding apparatus, means for establishing an electric welding circuit through a joint to be welded, a thermo-electric couple, means for focusing radiant energy from the joint upon said couple, and means controlled by current generated by said couple for breaking said circuit.

6. In an electric welding apparatus, means for passing an electric current through a joint to be welded, means responsive to a predetermined temperature at the joint for reducing the voltage of said current, and means controlled by radiant energy from said joint for interrupting said current.

7. In an electric welding apparatus, means for passing an electric welding current through a joint to be welded, means controlled by a predetermined electrical resistance at said joint for decreasing the voltage of said current, and means responsive to a predetermined temperature at said joint for interrupting said current.

8. In an electric welding apparatus, means for passing an electric welding current through a joint to be welded, means controlled by a predetermined electrical resistance at said joint for decreasing the voltage of said current, means responsive to radiant energy generated in said joint for interrupting said current when said joint has been heated to a predetermined temperature.

9. In an electric welding apparatus, means for passing an electric welding current through a joint to be welded, means controlled by a predetermined electrical resistance at said joint for decreasing the voltage of said current, means responsive to radiant heat from said joint for interrupting said current when said joint has been heated to a predetermined temperature.

10. In an electric welding apparatus, means for passing an electric welding current through a joint to be welded, means controlled by a predetermined electrical resistance at said joint for decreasing the voltage of said current, a thermo-electric couple adjacent the joint and adapted to be activated by radiant heat from said joint, and means controlled by current generated in said thermo-electric couple for interrupting said welding current.

11. In a resistance welding apparatus, a welding transformer, a pair of electrodes connected across the secondary winding of said transformer and adapted to lead current through a joint to be welded, means for connecting a portion of the primary winding of said transformer to a source of current, means for connecting more than said portion of the primary winding to said source when the electrical resistance across said electrodes reaches a predetermined value, and means controlled by radiant energy generated in said joint for disconnecting said primary winding from said source when said radiant energy reaches a predetermined intensity.

12. In a resistance welding apparatus, a welding transformer, a pair of electrodes connected across the secondary winding of said transformer and adapted to lead current through a joint to be welded, means for connecting a portion of the primary winding of said transformer to a source of current, means for connecting more than said portion of the primary winding to said source when the resistance across said electrodes reaches a predetermined value, and means controlled by radiant heat from said joint for disconnecting said primary winding from said source when the heat radiating from said joint reaches a predetermined temperature.

13. In a resistance welding apparatus, a welding transformer, a pair of electrodes connected across the secondary winding of said transformer and adapted to lead current through a joint to be welded, means for connecting a portion of the primary winding of said transformer to a source of current, means for connecting more than said portion of the primary winding to said source when the resistance across said electrodes reaches a predetermined value, a thermo-electric couple exposed to heat radiating from said joint, means controlled by current generated by the thermo-electric couple for disconnecting said primary winding from said source when the joint reaches a desired temperature.

14. An automatic electric welding machine comprising mechanism for feeding work to be welded to and from welding position, a pair of electrodes, mechanism for moving said electrodes to and from engagement with the work when the latter is in said position, driving means for said mechanism including a clutch, means mechanically controlled by the machine for disengaging the clutch and connecting the electrodes to a source of electric current while the electrodes are in engagement with the work, and means responsive to radiant energy generated in the work for disconnecting said electrodes from said source of current and re-engaging said clutch.

15. An automatic electric welding machine comprising mechanism for feeding work to welding position, a pair of electrodes, mechanism for moving the said electrodes into engagement with the work, mechanism for connecting the electrodes to a source of electric current and stopping the machine, means responsive to radiant energy generated in the work for disconnecting the electrodes from said source of energy and restarting the machine, and mechanism for swaging the weld and withdrawing the electrodes.

16. An automatic electric welding machine comprising mechanism for feeding work to welding position, a pair of electrodes, mechanism for moving the said electrodes into engagement with the work, mechanism for connecting the electrodes to a source of electric current and stopping the machine, means responsive to radiant energy generated in the work for disconnecting the electrodes from said source of energy and starting the machine, mechanism for swaging the weld, mechanism operating thereafter to restop the machine, means initiated by restopping of the machine for restarting the machine, the latter means including a delay action device, and mechanism operating after the machine has been restarted for withdrawing the electrodes.

17. An automatic electric welding machine comprising mechanism for feeding work to welding position, a pair of electrodes, mechanism for moving the said electrodes into engagement with the work, mechanism for connecting electrodes to a source of electric current and stopping the machine, means responsive to radiant energy generated in the work for disconnecting the electrodes from said source of energy and starting the machine, mechanism for swaging the weld, mechanism operating thereafter to restop the machine and permit the work to cool, means initiated by restopping of the machine for restarting the machine, the latter means including a slow acting relay to control the period of cooling of the work, and mechanism operating after the machine has been restarted for withdrawing the electrodes.

18. A method of welding a joint which includes the steps of passing an electric current through the joint to heat the same to a predetermined welding temperature, and using radiant energy generated at the joint to interrupt said current when said temperature has been reached.

19. In an electric welding apparatus, means for establishing an electric welding circuit through a joint to be welded, a switch in the circuit, a thermo-sensitive element exposed to heat generated at the joint, and means controlled by said element for opening said switch.

20. In an electric welding apparatus, means for establishing an electric welding circuit through a joint to be welded, a switch in the circuit, a thermo-sensitive element responsive to radiant heat from said joint, and means controlled by said element for opening said switch.

21. In an electric welding apparatus, means for establishing an electric welding circuit through a joint to be welded, a switch in the circuit, an element responsive to radiant energy generated at the joint, and means controlled by said element for opening said switch.

22. In a resistance welding apparatus, a pair of electrodes adapted to lead current through a joint to be welded, means for supplying the electrodes with a welding current of predetermined voltage, a transformer having a primary coil thereof shunted across the electrodes, a neon tube connected across the secondary coil of the transformer, a relay actuated under control of the neon tube when the difference of potential across the terminals of said tube reaches a predetermined value, means controlled by the relay for reducing the voltage of the welding current, and means responsive to radiant energy from the joint for interrupting the current when the temperature at the joint reaches a predetermined value.

HOWARD A. DELANO.
ELWOOD GREENE.